United States Patent [19]

Mahler

[11] 4,122,041

[45] Oct. 24, 1978

[54] SILICEOUS FIBERS AND METHOD OF PREPARING THEM

[75] Inventor: Walter Mahler, Wilmington, Del.

[73] Assignee: E. I. Du Pont de Nemours and Company, Wilmington, Del.

[21] Appl. No.: 812,404

[22] Filed: Jul. 1, 1977

Related U.S. Application Data

[63] Continuation-in-part of Ser. No. 720,848, Sep. 7, 1976, abandoned.

[51] Int. Cl.$^2$ .............................................. B01J 21/08
[52] U.S. Cl. ................................. 252/449; 252/477 R; 106/50; 264/DIG. 19
[58] Field of Search ........................... 252/449, 477 R; 423/325, 335, 338; 106/50; 264/DIG. 19

[56] References Cited

U.S. PATENT DOCUMENTS

| | | | |
|---|---|---|---|
| 2,461,841 | 2/1949 | Nordberg | 106/50 X |
| 3,614,809 | 10/1971 | Hayes et al. | 18/8 |
| 3,687,850 | 8/1972 | Gagin | 106/50 X |
| 3,843,561 | 10/1974 | Sobel | 252/477 R |

*Primary Examiner*—W. J. Shine

[57] ABSTRACT

Siliceous fibers characterized by being strong, water-insoluble, and porous, and having a five to seven-sided polygonal cross section are prepared by directionally freezing a quiescent body of aqueous polysilicic acid by subjecting it to a temperature of $-5°$ to $-200°$ C.

15 Claims, 2 Drawing Figures

SILICEOUS FIBERS AND METHOD OF PREPARING THEM

CROSS-REFERENCE TO RELATED APPLICATION

This is a continuation-in-part of copending application Ser. No. 720,848 filed Sep. 7, 1976, now abandoned.

BACKGROUND OF THE INVENTION

1. Field of the Invention

This invention relates to strong, water-insoluble, porous siliceous fibers, and to the process for preparing them.

2. Description of the Prior Art

In J. Amer. Ceram. Soc., 27, 299–305 (1944) Nordberg shows the preparation of 96% silica glass by heat-treating preformed bulky alkali-borosilicate glass objects above the annealing point, but below the deformation temperature, whereby the glass separates into two phases. The unstable phase, rich in boric oxide, is leached with water or acid to yield porous highly siliceous objects (reported to have surface areas of about 200 m$^2$/g and average pore sizes of about 20 Å). The porosity is then removed by heating at about 1200° C. Fibers are not mentioned.

In U.S. Pat. No. 2,461,841 Nordberg shows preparation of porous, highly siliceous fibers, not more than 0.001 inch in diameter, by leaching melt-spun alkali silicate fibers with aqueous solvents of pH not greater than 7. No specific degree of porosity is disclosed.

In U.S. Pat. No. 2,843,461 Labino shows leaching of flame-blown alkali silicate fibers less than 1.5 microns in diameter with aqueous ammonium chloride to yield porous fibers of almost pure silica. No specific porosity is disclosed.

In U.S. Pat. No. 3,110,545 Beasley et al. show rapid drying of thin films of aqueous sols of various oxides, including silica and alumina, in an edgewise manner whereby the dried film fractures into porous filaments of rectangular cross section.

In U.S. Pat. No. 3,681,017 Butcher et al. teach the preparation of porous silica platelets having surface areas of 400 to 500 m$^2$/g and an average pore size of 70 Å by freezing and then thawing an ammonium stabilized silicic acid solution. The solution may have a pH from 2.5 to 10.5. The solution may be stored from 10 minutes to weeks or more before freezing. Freezing is carried out in the range from −5° to −195° C.

SUMMARY OF THE INVENTION

In accordance with this invention porous, water-insoluble siliceous fibers have been discovered which are characterized by having a cross-sectional diameter of about 0.001 to about 0.5 mm, and a cross-sectional shape in the form of a five to seven-sided polygon in which at least one side is concave. These fibers are generally further characterized by having a surface area of at least about 10 m$^2$/g, a tensile strength of at least about 5,000 lb/in$^2$, a density of about 1.8 to about 2.2 g/cc by flotation, and an essential chemical composition corresponding to the formula

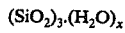

in which $x$ is a fractional or whole number from about 0 to about 6.

These fibers are distinguished from the siliceous fibers of the prior art in that they have a cross-sectional shape in the form of a polygon. This polygonal shape is further characterized by at least one side being concave. The fibers of this invention are brightly coruscant under illumination. Light is reflected from the facet-like, flat and concave faces, and additional light effects result from refraction through the lens-like fibers. This makes the fibers useful for decorative purposes.

A preferred group of the above water-insoluble siliceous fibers are exceptionally porous, having a surface area of at least about 500 m$^2$/g, a pore volume of about 0.2 to about 0.75 cc/g, an average pore diameter of about 10 to about 100 Å, and an essential chemical composition corresponding to the above formula in which $x$ is a fractional or whole number from about 0.5 to about 6.

These siliceous fibers are prepared by the process which comprises directionally freezing a quiescent body of aqueous polysilicic acid which (1) has an SiO$_2$ content of about 0.5 to about 20% by weight, (2) has a pH of about 1 to about 7, and (3) has polymerized to the point where fibers formed from it by directional freezing are water-insoluble, but has not cross-linked to the extent that it contains substantially less than one mole of H$_2$O for every 3 moles of SiO$_2$, by subjecting it to a temperature of about −5° to about −200° C., whereby a solid-liquid interface advances through the body of polysilicic acid at a rate such that ice grows in a cellular substructure and siliceous fibers form parallel to the direction of advance of the interface; allowing the frozen mass to thaw; and isolating the resulting water-insoluble siliceous fibers.

In a preferred embodiment of the process, the quiescent body of aqueous polysilicic acid has an SiO$_2$ content of about 4 to about 15% by weight and a pH of about 3 to about 6, the directional freezing is carried out by subjecting the body of polysilicic acid to a temperature of about −10° to about −100° C., and the solid-liquid interface is advanced through the body of the polysilicic acid at the rate of at least about 0.2 cm/hr.

DESCRIPTION OF THE PREFERRED EMBODIMENT

Figure 1:
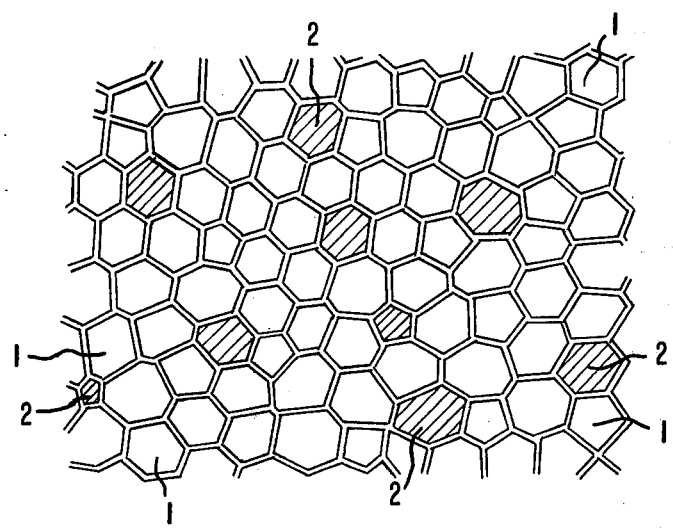
FIG. 1 is an illustration of a cross section of a frozen mass in accordance with this invention showing a cellular substructure of ice and siliceous fibers.

This invention is based on the discovery that siliceous fibers can be obtained by freezing aqueous polysilicic acid with two major requirements in combination, (1) the polysilicic acid must have polymerized to the point where fibers formed from it by directional freezing are water-insoluble, and preferably to the point of gelation, but must not have cross-linked to the extent that it contains substantially less than one mole of H$_2$O for every 3 moles of SiO$_2$, and (2) the freezing must take place by advancing the solid-liquid interface through the body of polysilicic acid at a rate such that ice grows in a cellular substructure.

The siliceous fibers of this invention vary in composition from hydrous silica having a silica content from about 62.5% by weight SiO₂ to pure silica, depending upon the drying temperature, e.g., from room temperature to about 250° C., and whether there has been further heating at higher temperatures.

The fibers of this invention are characterized by having cross sections perpendicular to the main fiber axis which are five to seven-sided polygons, i.e., pentagons, hexagons and heptagons. The most common polygonal cross-sectional unit is the hexagon. The polygons are mostly irregular. In each polygon at least one side is concave and in some of the polygons all sides are concave. The polygon structure appears to be related to the fact that the fibers are formed in conjunction with the crystallization of water in a cellular substructure.

The siliceous fibers of this invention have cross-sectional diameters of about 0.001 to about 0.5 mm, and most commonly have cross-sectional diameters of about 0.01 to about 0.2 mm. By "cross-sectional diameter" is meant the diameter of the smallest round hole through which the fiber will pass lengthwise. These fibers generally have a surface area of at least about 10 m²/g.

The preferred fibers are highly porous and have a surface area of at least about 500 m²/g, and preferably from about 500 to about 1200 m²/g. The pore volumes of these preferred fibers are in the range of about 0.2 to about 0.75 cc/g, and preferably about 0.25 to about 0.5 cc/g. Average pore diameters range from about 10 to about 100 Å, and preferably are from about 20 to about 60 Å.

In view of the exceptionally high porosity of the preferred siliceous fibers of this invention, their high strength is remarkable. Product fibers dried at room temperature generally have tensile strengths from about 5000 to about 50,000 lb/in², and preferably average at least about 10,000 lb/in². The density of the fibers measured by flotation is generally about 1.8 to about 2.2 g/cc, and most commonly about 1.85 to about 2.0 g/cc. The refractive index for light of 5461 Å wavelength is generally about 1.4 to about 1.5.

The siliceous fibers of this invention may be represented compositionally by the formula $$(SiO_2)_3 \cdot (H_2O)_x \qquad I$$

in which x is a fractional or whole number from about 0 to about 6. This includes the full range of siliceous fibers from those freshly formed in which x is about 6 and containing about 62.5% SiO₂, through the partially dehydrated fibers in which x is about 1 and containing about 91% SiO₂, and the moderately heated fibers in which x is about 0.5 and containing about 95% SiO₂, to the fully dehydrated fibers in which x is about 0.

The composition $(SiO_2)_3 \cdot H_2O$ which is reached by drying the fibers to constant weight at about 150° to about 250° C. can be more accurately expressed as $Si_3O_5(OH)_2$ for which the following polymer unit can be visualized.

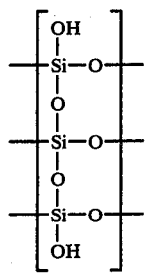

It is possible that the more hydrated intermediate fibers have similar structures with associated water molecules, e.g. $Si_3O_5(OH)_2(H_2O)_z$ where z is from about 0 to about 5.

The siliceous fibers, as formed by directional freezing, have compositions corresponding to formula I in which x is from about 1 to about 6. These fibers are exceptionally porous, having surface areas in the range of about 550 to about 1200 m²/g, and preferably in the range of about 550 to about 950 m²/g. The preferred fibers are those in which x is about 1 to about 2. All of these fibers can be brought to the composition in which x is about 1 [or $Si_3O_5(OH)_2$] by heating to constant weight at about 150° to about 250° C. These fibers are highly absorbent and represent the most preferred products of this invention.

When fibers having the composition in which x is about 1 are heated at temperatures in the range of about 250° to about 500° C., some water is expelled and fibers having compositions in which x is from about 0.5 to about 1 are obtained. The loss of water is accompanied by some small decrease in the porosity of the fibers. However, the surface areas of these fibers are still above about 500 m²/g and the fibers are highly absorbent. The fibers having compositions in which x is from about 0.5 to about 1 represent the next most preferred group of the products of this invention.

When the above fibers are heated in the range of about 500° to about 1200° C., more water is split out and fibers having compositions in which x is from about 0 to about 0.5 are obtained. The loss of water is accompanied by a proportional decrease in the porosity as measured by surface area and a corresponding decrease in the absorbent properties of the fibers. However, as shown in Examples 7 and 8, even when x is 0 and the composition corresponds to SiO₂, some measurable porosity remains as evidenced by a surface area of the order of about 10 to about 20 m²/g. If these fibers had no porosity, the surface area of the fibers would be less than about 1 m²/g.

Heating the fibers of this invention above about 1200° C. is to be avoided. Such heating results first in a large drop in tensile strength of the fibers due to crystallization of the silica. When the compositions are heated in the range of their melting temperature, the characteristic polygonal cross section is lost through the rounding effects of surface tension and the fibers become difficult to distinguish from known round fibers spun from molten silica.

The siliceous fibers of this invention are prepared by directionally freezing aqueous polysilicic acid, allowing the frozen mass to thaw, and isolating the resulting water-insoluble siliceous fibers. The aqueous polysilicic acid solution should have an SiO₂ content of about 0.5 to about 20% by weight, and preferably about 4 to about 15%.

It is generally recognized that, in freshly prepared silicic acid solutions, the silicic acid is not monomeric, but has a number average molecular weight in the range of about 500 to about 1500. As the polysilicic acid ages, the molecular weight increases and at least some cross-linking occurs. With further aging, the solution gels and the molecular weight continues to increase in the gel by cross-linking of the polymer chains through condensation of hydroxyl groups, whereby additional water is eliminated from the structure of the polymer.

Since the molecular weight and cross-linking of the polysilicic acid can be controlled by a number of variables such as the concentration of the polysilicic acid solution, the presence of additives, the pH of the polysilicic acid, and the aging time and temperature, operability of the process is affected by these same factors. The rate of polymerization is highest at a pH of about 4.5 to about 6, and the rate is further increased by the presence of selected additives, particularly fluoride ion.

The aqueous polysilicic acid solutions used in this invention may be unmodified or may contain up to about 0.4% by weight of dissolved additives which serve to regulate the pH of the solution and the speed of polymerization or gelling. Suitable additives include ammonia; inorganic salts such as ammonium and metal halides (e.g. F, Cl, Br, I), sulfates, nitrates, phosphates, carbonates, borates, chlorates, chromates, cyanides, and the like; substituted ammonium salts such as the tetraalkylammonium halides, sulfates, and the like; alkali metal salts of organic acids such as sodium acetate; and inorganic acids such as the hydrohalide acids, sulfuric acid, nitric acid, phosphoric acid, and the like. A pH in the range of about 1 to about 6 can be used. A pH of about 3 to about 5.5 is preferred. Solutes which are soluble after the freezing process are readily washed out of the fibers after thawing.

Although it is possible to change any one variable in the polysilicic acid solution, or any one factor affecting aging of the polysilicic acid, over a considerable range, other variables usually must be changed in concert if the polysilicic acid is to be in the form of insoluble fibers at the time of thawing. For example, at a pH of 3, a 6% polysilicic acid solution which is subjected to a temperature of $-78°$ C. and thawed quickly should be aged at 25° C. for at least 5 days before being frozen. Under some conditions aging times in excess of 90 days may be used before preparing fibers by directional freezing. At a pH of 5 the minimum aging period is only a few minutes.

The formation of solids in a cellular substructure by directional freezing of melts is a well-known phenomenon, particularly for metals; for example, see Tiller et al., *Acta Metallurgica*, Vol. 1, 428–437, July 1953; Harrison et al., *J. Applied Physics*, Vol. 34, No. 11, 3349–3355, November 1963; and Chalmers, *Principles of Solidification*, pages 150–163, John Wiley and Sons, N.Y. (1964).

In general, ice can be produced in a cellular substructure by controlled directional freezing of water containing a solute. In the case of the aqueous solutions of this invention, the polysilicic acid and any other ingredients present, such as salts, act as the solute. The concentration of the polysilicic acid and the amount and nature of any other solute present will be factors in determining whether a cellular substructure is obtained.

Although it is not intended that this invention be limited to any particular theory, it is believed that the siliceous fibers of this invention are formed in the following manner. Growth of ice in a cellular substructure is accomplished by advancing the solid-liquid interface through the body of aqueous polysilicic acid at a rate which provides a region of constitutional supercooling ahead of the advancing interface. As ice forms at the interface, it rejects the solute thus increasing the concentration of solute in the body of aqueous polysilicic acid ahead of the solid-liquid interface. Since the concentration of solute in the body of aqueous polysilicic acid is greatest at the interface, the temperature at the interface is below the freezing temperature of the body of aqueous polysilicic acid everywhere except at the interface.

If the temperature at a certain point in the body of aqueous polysilicic acid, as maintained by the temperature gradient across the interface, is lower than the freezing point of the body of aqueous polysilicic acid at that point, then the body of aqueous polysilicic acid at that point is constitutionally supercooled. In other words, "constitutional supercooling" is the condition in which the body of aqueous polysilicic acid in the region ahead of the interface is below its freezing point, while at the same time being above the temperature at the interface. Under these conditions ice will form in cellular substructure provided the interface is advancing at a rate which maintains these conditions.

It is believed that, when freezing begins, water separates from the polysilicic acid solution and freezes. As freezing proceeds, more water separates and the polysilicic acid is packed progressively tighter between the growing crystals of ice until all but the chemically bound water separates from the polysilicic acid and freezes. As the polysilicic acid concentration increases, its degree of polymerization also increases.

It is speculated that the rate of directional freezing of a body of aqueous polysilicic acid (for example, in the form of a cylinder) must not exceed the rate at which the polysilicic acid which separates from the ice can flow into the channels between the ice crystals. Highly polymerized polysilicic acid gels give fibers only when frozen at a slow rate (e.g. at about 2 cm/hr), but lower molecular weight polysilicic acid can yield fibers when frozen at a faster rate.

FIG. 1 illustrates a cross section of ice and siliceous fibers in cellular substructure. Ice crystals are designated as 1 while siliceous fibers are designated as 2. The primary axis of the siliceous fibers is parallel to the direction of advance of the solid-liquid interface and perpendicular to the plane of the interface.

A simple method of achieving ice growth in a cellular substructure is to place a beaker of aqueous polysilicic acid on Dry Ice. This method is more readily controlled if the bottom of the container is a thermal transmitter such as a metal and the sides are thermal insulators. A more suitable embodiment for reproducibly controlling directional freezing is to lower a cylinder containing aqueous polysilicic acid at a uniform speed into an acetone/Dry Ice freezing bath.

If the combination of variables relating to degree of polymerization and formation of cellular substructure is incorrect, one obtains either no insoluble product (inadequate aging), a paste (generally due to inadequate aging), or flakes (due to excess aging or cooling rates too fast or too slow).

The body of aqueous polysilicic acid is in the form of a quiescent liquid or a gel at the time of freezing. If the polysilicic acid being frozen is in the form of a liquid, insoluble fibers will be obtained on thawing only if a required minimum degree of polymerization and cross-linking of the polysilicic acid has been reached before freezing. If the degree of polymerization and cross-linking is too low at the time of freezing, the polysilicic acid, even though segregated into fibrous form by freezing, will redissolve when the mass is thawed. Too low a molecular weight can also lead to formation of a paste from which little water separates on thawing.

Preferably, the aqueous polysilicic acid is gelled at the time of freezing. Gelation of the solution indicates that the polysilicic acid is polymerized beyond the minimum degree required for the isolation of insoluble siliceous fibers upon thawing. However, the gel can be aged too far. If the gelled polysilicic acid has further cross-linked significantly, the directional freezing process may convert the polysilicic acid into insoluble flakes instead of fibers.

In the process of this invention the longest siliceous fibers are obtained when physical disturbance of the medium being frozen is kept to a minimum. When the medium is gelled, it is easier to avoid physical disturbance. If the solution is a flowable liquid, care must be taken to maintain it in a quiescent state as it is being frozen.

The siliceous fibers of this invention are obtained when the solid-liquid interface advances through the body of polysilicic acid in an essentially unidirectional manner. The rate of freezing, i.e., the rate at which the interface advances through the polysilicic acid, may vary widely within the range which provides a region of constitutional supercooling ahead of the advancing interface. Preferably, the freezing rate is at least about 0.2 cm/hr, and most preferably at least about 2 cm/hr. The optimum rate will depend on the concentration of the polysilicic acid, its degree of polymerization, the pH of the solution, its cross-sectional area and shape, the presence or absence of other solutes, the temperature of the freezing zone, and the thermal conductivity in the growth direction compared to the thermal conductivity in the other direction. Because of the several interdependent variables, it is to be understood that many, but not all, of the possible combinations within the ranges of the variables noted above will produce siliceous fibers.

Heat transfer during the freezing process (and hence the rate of freezing) takes place more rapidly with the refrigerant in the lower temperature ranges. Heat transfer may also be improved by inserting into the polysilicic acid heat conducting flanges which may be in contact with the refrigerant.

As shown in the examples below, siliceous fibers of almost any predetermined length may be prepared by the process of this invention, and continuous fibers may be prepared by operating the process in a continuous manner. Operable freezing procedures include processes in which the aqueous polysilicic acid, quiescent within itself, is moved continuously as an elongated liquid body into a liquid freezing bath with direct contact between the two.

The preferred highly porous fibers of this invention are useful as absorbents for removing dissolved or suspended materials from water, and as high surface area supports for catalysts. All of the fibers of this invention are useful in sheet form as nonflammable felt, batting, mats or papers for use as thermal and electrical insulation, as filtration media and as battery separators. Because they are polygonal in cross section and thus are brightly coruscant under illumination, all of the fibers of this invention are also useful for decorative purposes.

The following examples illustrate the products and process of this invention. In these examples, percentages are by weight unless otherwise specified. All temperatures are in degrees centigrade. Surface areas of the products were determined by the BET method described by Brunauer, Emmett and Teller in *J. Am. Chem. Soc.*, 60, 309–319 (1938). Pore volume and average pore diameter values were determined by standard methods as described by S. J. Gregg in *The Surface Chemistry of Solids*, Reinhold, 1961, pgs. 284–287.

EXAMPLE 1

A solution of commercial sodium silicate (Du Pont "F-Grade", $SiO_2/Na_2O$ = 3.25, $SiO_2$ content = 30%) was diluted with water to give a solution containing 7% $SiO_2$ and passed through a column of ion exchange resin in the acid form. This gave a silicic acid solution with a pH of 3.0. One hundred milliliters of this solution was rapidly mixed with 0.3 ml of 1N ammonia solution (0.0051% $NH_3$ based on the total solution), which raised the pH to 5.2. This mixture was poured into a 100 ml plastic cylinder (2.5 × 25 cm). After 10 minutes this transformed into a gel. One hour after gelling, the cylinder was lowered into a −78° bath (Dry Ice/acetone) at the rate of 5 cm per hour. When the column of polysilicic acid was fully immersed in the bath, it was removed and allowed to warm at room temperature. When the ice column had just begun to thaw, it was transferred from the cylinder to a pan where it was allowed to thaw completely. At this stage, 85 ml of water was decanted, leaving a bundle of fibers 15 cm long. Individual fibers were about 0.05 mm in cross section. These were dried at 225° after which they retained their parallel alignment. The surface area of these fibers was 852 $m^2/g$.

Figure 2:
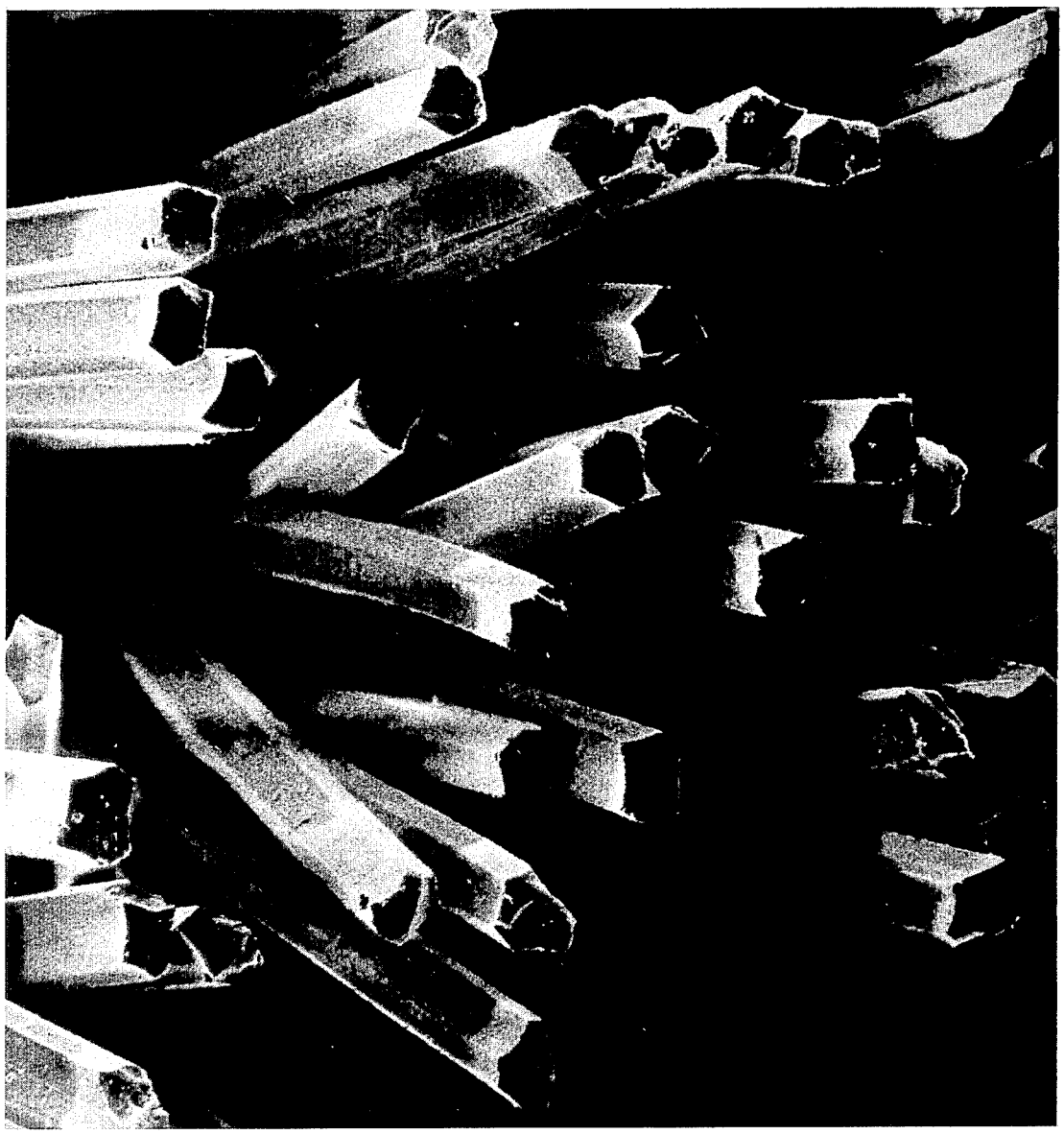
FIG. 2 is a 430X photograph of a cross-sectionally cut bundle of siliceous fibers prepared by the procedure of Example 1.

This example was repeated to provide additional fibers. A bundle of these fibers was cross-sectionally cut to provide the photograph of FIG. 2.

When the procedure of Example 1 was repeated, except that the cylinder was lowered into the bath immediately after gelling of the silicic acid solution, similar fibers were obtained.

When the procedure of Example 1 was repeated, except that the cylinder was not lowered into the bath until four days after the silicic acid solution gelled, similar fibers were obtained.

When the procedure of Example 1 was repeated, except that the contents of the cylinder were allowed to thaw without removing them from the cylinder, the fibers became entangled on transfer and had the appearance of uncarded cotton after drying.

EXAMPLE 2

A 7% silicic acid effluent prepared as in Example 1, but without the addition of ammonia, had a pH of 3.5. Eighty-five ml of this solution was poured into a 100 ml cylinder. This gelled in about 20 hours. Twenty-four hours after preparation of the silicic acid, it was lowered into a −78° bath at the rate of about 5 cm per hour. Fibers 13 cm long and 0.1 mm in cross-sectional diameter were found after thawing. The fibers were rinsed out of the cylinder into a pan, the water was decanted, and the fibers were dried at 220° C. for 1 hour. They had the appearance of uncarded cotton.

EXAMPLE 3

Example 2 was repeated except that the solution was left to stand for 48 hours before freezing. Fibers of the same appearance were produced. The surface area of the fibers was 676 $m^2/g$.

EXAMPLE 4

A 7% silicic acid solution having a pH of 2.9 was made $2 \times 10^{-3}$ molar in ammonium nitrate by the addition of 1 ml of 1M $NH_4NO_3$ (0.016% $NH_4NO_3$ based on the total solution) to 500 ml of the silicic acid solution. Three hundred-fifty ml of this mixture was placed in a 500 ml plastic graduated cylinder. The solution gelled in 16 hours and aged for 72 hours after gelling. It was then lowered into a $-78°$ bath at the rate of 1 cm per hour. After the contents of the cylinder were frozen, they were removed from the bath and allowed to warm and, when partially thawed, the cylinder of ice was placed in a glass dish. A 5-cm section that had been at the bottom of the cylinder was a voluminous, flaky product, but the 10-cm section above the consisted entirely of parallel fibers. These were dried in air for 1 day at room temperature, and by analysis had a composition corresponding to the formula $(SiO_2)_3.(H_2O)_{4.5}$. After these fibers were heated at 925° for 8 hours and then cooled they had an average tensile strength of 74,000 $lbs/in^2$ and several of the strongest individual fibers had tensile strengths exceeding 150,000 $lbs/in^2$.

EXAMPLE 5

Eighty ml of silicic acid/$NH_4NO_3$ solution, prepared as in Example 4, was aged for 50 hours, and then frozen as in Example 4 in a 100 ml plastic tube. The tube contents were thawed completely in place and the wet fibers removed by letting them cling to a spatula. These were 3 to 11 cm long, 0.08 mm wide, and showed some birefringence.

EXAMPLE 6

One hundred ml of a 7% silicic acid solution, pH 2.6, was aged for 5 days in a plastic cylinder, then immersed at the rate of 5 cm per hour into a $-78°$ bath. After thawing, decanting the water, and drying at 220° for 1 hour, fibers measuring 10 mm × 0.1 mm were obtained. These fibers had a surface area of 622 $m^2/g$.

EXAMPLE 7

Five hundred ml of a 6.8% solution of silicic acid, pH 2.9, was kept in a 1 liter plastic beaker. It gelled in one day and stood at room temperature another day. The beaker was placed on crushed Dry Ice in an insulated bucket for 2 days during which time directional freezing took place. The mass was then allowed to thaw slowly at room temperature. Fibers 2 cm × 0.1 mm had formed. These were isolated by filtration and dried at 250° C. Evaporation of the filtrate showed it contained no nonvolatile residue; therefore the yield of fibers was 100%. Elemental analysis of the fibers corresponded to a composition of $(SiO_2)_3.H_2O$. Surface area measurements were 653 $m^2/g$ and 685 $m^2/g$, pore volume was 0.48 cc/g, and average pore diameter was 36 Å. After heating at 600° for 8 hours, the surface area was 446 $m^2/g$, the pore volume was 0.21 cc/g and the average pore diameter was 14.5 Å. After heating at 800° for 8 hours, the surface area was 71 $m^2/g$, and after heating at 1000° for 8 hours, the surface area was 17.2 $m^2/g$.

EXAMPLE 8

Three hundred ml of 6% silicic acid, pH 3.2, was allowed to gel in a plastic beaker and put on a cake of Dry Ice for directional freezing to take place. After thawing, fibers 1 cm × 0.1 mm had formed. These were dried in a vacuum at 25°. The surface area was 595 $m^2/g$, the pore volume was 0.29 cc/g, and the average pore diameter was 14.5 Å. The cross sections of most of the fibers were irregular hexagons and the tensile strength was 12,500 $lb/in^2$. The strongest of 10 fibers had a tensile strength of 20,200 $lb/in^2$. The refractive index was 1.40 at 5461 Å. The density was 1.97 g/cc by flotation.

A sample of these fibers was heated at 800° for 24 hours. The composition now corresponded to $SiO_2$ and the average tensile strength was 23,100 $lb/in^2$, while the strongest of 10 fibers had a value of 49,500 $lb/in^2$. The refractive index was 1.40 at 5461 Å.

Further heating at 1000° for 8 hours increased the tensile strength to 36,700 $lb/in^2$; the strongest of 10 fibers was 51,000 $lb/in^2$. After heating at 1200° C. for 8 hours, the average tensile strength was 8,100 $lb/in^2$, with the strongest fiber being 16,300 $lb/in^2$. These fibers had a refractive index of 1.46 at 5461 Å and a density of 2.20 and still retained their characteristic polygonal structure.

EXAMPLE 9

A 7.4% silicic acid solution was divided into 150-ml and 10-ml batches in plastic bottles. A 10-ml sample was directionally frozen by placing the plastic bottle on Dry Ice at $-78°$ for 4 hours. After thawing, it appeared unchanged from the original solution. A 150-ml batch, directionally frozen by placing the plastic bottle on Dry Ice for 6 hours and allowed to thaw at room temperature, yielded insoluble fibers.

Samples of the 150-ml batch that had aged 30 minutes at 25° were directionally frozen on Dry Ice and upon thawing gave fibers. The same result was obtained on a 150-ml batch that was aged for 4.5 hours at 25° before directionally freezing on Dry Ice.

A sample of these fibers, dried at room temperature for one day in vacuum, had a composition of $(SiO_2)_3.(H_2O)_2$ according to elemental analysis.

EXAMPLE 10

A 10-ml sample of 7.4% silicic acid, pH 2.6, was frozen by placing a 20-ml glass vial containing the sample on Dry Ice ($-78°$), and thawed after 1 hour. A very small amount of insoluble flakes had formed. This sample was directionally refrozen by again placing the vial on Dry Ice and then kept at $-10°$ for 20 minutes. On thawing, this formed an agglomeration of fibrous material and water. This mixture was pressed between two pieces of wire mesh screen backed by paper towels and dried to give a paper-like product with reasonable strength.

EXAMPLE 11

One hundred ml of 1.5% silicic acid solution, pH 3.2, was directionally frozen in a 15 ml plastic bottle on Dry Ice ($-78°$) for 10 minutes, kept at $-20°$ for 1 hour, and then allowed to thaw. Fibers 0.4 mm long and $2 \times 10^{-3}$ mm in cross-sectional diameter were obtained.

EXAMPLE 12

This example illustrates the purification of water by passing it over siliceous fibers of this invention. Siliceous fibers (6.4 g) prepared as in Example 7 were packed into a 1-cm diameter glass column with an open stopcock on the bottom. A 0.1% aqueous phenol solution (76 cc) was poured onto the fibers from above, and allowed to flow out the tube. This was followed by 100 ml of water. The total effluent was analyzed and found to contain 3 parts per million of phenol, corresponding to a total of 530 micrograms of phenol compared to 76,000 micrograms of phenol in the influent.

EXAMPLE 13

A 6.6% aqueous polysilicic acid solution was prepared with a pH of 3.0. Three 100 ml plastic tubes were filled with this solution and allowed to stand at room temperature. After one day the solutions were gelled and were allowed to stand for two more days. The gelled solutions were then directionally frozen by lowering the tubes at the rate of 8 cm per hour into freezing baths. The first bath was at $-20°$ C. After freezing, the first tube contents were thawed to obtain a mixture of siliceous fibers and flakes. The fibers were about 2 mm long, 0.25 mm in cross-sectional diameter and had a surface area of 777 $m^2/g$. The second bath was at $-78°$. After freezing, the contents of the second tube were thawed to obtain siliceous fibers 15 cm long, 0.1 mm in cross-sectional diameter and having a surface area of 751 $m^2/g$. The third bath was at $-196°$ C. After freezing, the contents of the third tube were thawed to obtain siliceous fibers 15 cm long, 0.02 mm in cross-sectional diameter and having a surface area of 708 $m^2/g$.

EXAMPLE 14

A 6.6% aqueous polysilicic acid solution (pH 3.0) was adjusted to pH 5.0 by addition of 1N $NH_4OH$. Three 600 ml portions of this solution were poured respectively into two rectangular aluminum foil dishes (12.7 × 20.3 × 5.1 cm) and a 2 mm thick circular polyethylene dish 15.2 cm in diameter with 7.6 cm vertical sides. The solutions were aged 5 hours and then directionally frozen by floating the three dishes in an acetone bath at $-47°$ until frozen. Freezing times and total time in the freezing bath are indicated below. The frozen blocks were thawed on a stainless steel screen. The resulting fibers were washed with water and dried at 130° under vacuum.

| Dish | Freezing Time (hr) | Time in Bath (hr) | Product |
|---|---|---|---|
| Aluminum | ½ | ½ | 34.9 g short, fine fibers |
| Aluminum | ½ | 2 | 35.1 g short, fine fibers |
| Polyethylene | 1½ | 2 | 37.9 g long fibers (1¼") |

EXAMPLE 15

This example shows the use of the porous fibers of this invention for absorbing viral contaminants from aqueous systems. Porous silica fibers prepared by the procedure of Example 1 were crushed lightly in a mortar to shorten their length. Into water which was 0.01 molar in NaCl, 0.0015 molar in $MgCl_2$, 0.01 molar in tris(hydroxymethyl)aminomethane buffer and had a pH of 7.2 was added poliovirus type 2 (Sabin) in 5% fetal bovine serum to a titer of about $2 \times 10^9$/ml. Four 2 ml portions of this virus suspension were placed in separate plastic vials. The first served as a control. To the other three vials were added respectively 0.001 g, 0.01 g and 0.1 g of the crushed silica fibers. The vials were capped, mounted on a wheel, rotated about 3 rpm at 6° C. for 15 minutes and then allowed to stand 5 minutes for gravity settling of the silica fibers. Assay of the supernatant liquids showed the following virus titers: control $2 \times 10^9$/ml (no change), second vial $9.3 \times 10^8$ ml, third vial $2.35 \times 10^8$/ml and fourth vial $2.02 \times 10^7$/ml. The removal of virus was proportional to the amount of porous silica fibers used, and in the fourth vial about 99% of the virus was removed from the suspension by this treatment.

EXAMPLE 16

Freshly prepared 6% aqueous silicic acid with a pH of 2.9 was divided into eleven 100 ml samples which were placed in plastic tubes of 2.5 cm inside diameter and aged ¼, 1, 2, 3, 4, 5, 6, 7, 9, 12 and 20 days respectively before being directionally frozen by the procedure shown in Example 4. When thawed, the samples aged 5 days or less gave silica flakes and the samples aged 6 days or more all gave silica fibers.

EXAMPLE 17

A plastic cylinder of 62 mm inside diameter was fitted with a hemisphere of Wood's metal at its fundus. Into this container was placed 600 ml of freshly prepared 6% aqueous silicic acid which had been adjusted to pH 5.0 by adding 1N aqueous ammonia. The solution gelled in 15 minutes. After 1 hour at room temperature the assembly was placed upright on a bed of Dry Ice for directional freezing to take place. Because heat was conducted through the metal at the bottom of the tube and there was very little heat conduction through the sides of the tube, the ice front traveled unidirectionally up the tube. After the gel was completely frozen, the periphery was allowed to thaw, the ice cylinder was removed from the tube and allowed to melt in a pan. The lower 1-cm portion (next to metal) consisted of flakes. The next 5-cm section was composed of fibers 0.03–0.08 mm in diameter and 1–3 mm in length, having a surface area of 825 $m^2/g$. The next 6-cm section had fibers 0.08–0.2 mm in cross section and about 3 cm long having a surface area of 793 $m^2/g$. The top 6-cm section consisted of rods of about 1 mm × 1 cm having a surface area of 762 $m^2/g$.

EXAMPLE 18

A container, as described in Example 17, was filled with fresh 6% silicic acid at pH 3 and aged for 8 days. It was then cooled to 5° and the metal bottom placed in contact with Dry Ice for 20 hr during which time unidirectional freezing was completed. Then the frozen mass was thawed slightly, the ice was removed from the tube and allowed to thaw. Long siliceous fibers were obtained and a typical single fiber 11 cm long examined under the microscope had the characteristic hexagonal cross section and had a diameter of 0.04 mm on the lower end, 0.08 mm in the middle and 0.3 mm at the top.

EXAMPLE 19

A container was constructed from a fiber glass-plastic pipe 22 cm in diameter and 11 cm high into which a 1 cm thick Wood's metal bottom was fitted. A 2-liter sample of freshly prepared 6% aqueous silicic acid which had been adjusted to pH 5 was placed in the container, aged for 30 minutes at room temperature and then placed on Dry Ice for directional freezing which was accomplished in 2 hours. Thawing yielded siliceous fibers 3 to 5 cm long and about 0.05 mm in diameter.

When the above procedure was repeated except for placing the bottom of the container in contact with a Dry Ice-acetone bath, the results were the same.

I claim:

1. A porous, water-insoluble siliceous fiber characterized by having a cross-sectional diameter of 0.001 to 0.5 mm, and a cross-sectional shape in the form of a five to seven-sided polygon in which at least one side is concave, and an essential chemical composition corresponding to the formula $$(SiO_2)_3 \cdot (H_2O)_x$$

in which $x$ is a fractional or whole number from 0 to 6.

2. The siliceous fiber of claim 1 which is further characterized by having a surface area of at least 10 m$^2$/g, a tensile strength of at least 5,000 lb/in$^2$, and a density of 1.8 to 2.2 g/cc by flotation.

3. The siliceous fiber of claim 1 which is further characterized by having a surface area of at least 500 m$^2$/g.

4. The siliceous fiber of claim 3 which is further characterized by having a pore volume of at least 0.2 cc/g, an average pore diameter of 10–100 Å, and a chemical composition in which $x$ is a fractional or whole number from 0.5 to 6.

5. The siliceous fiber of claim 4 characterized by having a surface area of 550 to 1200 m$^2$/g.

6. The siliceous fiber of claim 5 characterized by having a cross-sectional diameter of 0.01 to 0.2 mm, a tensile strength of at least 5,000 lb/in$^2$, and a density of 1.8 to 2.2 g/cc by flotation.

7. The siliceous fiber of claim 6 characterized by having a surface area of 550 to 1200 m$^2$/g, a pore volume of 0.2 to 0.75 cc/g, and an average pore diameter of 10 to 100 Å.

8. A method of making porous, water-insoluble siliceous fibers which comprises directionally freezing a quiescent body of aqueous polysilicic acid which
   (1) has an SiO$_2$ content of 0.5 to 20% by weight,
   (2) has a pH of 1 to 7, and
   (3) has polymerized to the point where fibers formed from it by directional freezing are water-insoluble, but has not cross-linked to the extent that it contains substantially less than 1 mole of H$_2$O for every three moles of SiO$_2$, by subjecting it to a temperature of $-5°$ to $-200°$ C. whereby a solid-liquid interface advances through the body of polysilicic acid at a rate such that ice grows in a cellular substructure and siliceous fibers form parallel to the direction of advance of the interface; allowing the frozen mass to thaw; and isolating the resulting porous, water-insoluble siliceous fibers.

9. The method of claim 8 in which the body of polysilicic acid is subjected to a temperature of $-10°$ to $-100°$ C., and the solid-liquid interface advances through the body of polysilicic acid at the rate of at least 0.2 cm/hr.

10. The method of claim 9 in which the aqueous polysilicic acid has an SiO$_2$ content of 4 to 15% by weight, and a pH of 3 to 6, and the solid-liquid interface advances through the body of polysilicic acid at the rate of at least 2 cm/hr.

11. The method of claim 10 in which the aqueous polysilicic acid has a pH of 4.5 to 6.

12. The method of claim 11 in which the body of polysilicic acid is in the form of a gel.

13. A sheet composed of siliceous fibers in accordance with claim 1.

14. The sheet of claim 13 in the form of felt.

15. The sheet of claim 13 in the form of paper.

* * * * *